(12) United States Patent
Gurevich

(10) Patent No.: US 11,423,242 B2
(45) Date of Patent: Aug. 23, 2022

(54) METHODS AND APPARATUS TO PROVIDE RADIAL AIMING PATTERNS

(71) Applicant: ZEBRA TECHNOLOGIES CORPORATION, Lincolnshire, IL (US)

(72) Inventor: Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/689,873

(22) Filed: Nov. 20, 2019

(65) Prior Publication Data
US 2021/0150163 A1    May 20, 2021

(51) Int. Cl.
G06K 7/10    (2006.01)
G06K 7/14    (2006.01)

(52) U.S. Cl.
CPC ....... *G06K 7/10722* (2013.01); *G06K 7/1413* (2013.01)

(58) Field of Classification Search
CPC ............. G06K 7/10722; G06K 7/1413; G06K 2207/1011; G06K 7/10881
See application file for complete search history.

(56) References Cited

U.S. PATENT DOCUMENTS

| | | | | |
|---|---|---|---|---|
| 4,877,324 A * | 10/1989 | Hauri | ...................... | G02B 27/34 356/252 |
| 6,000,619 A * | 12/1999 | Reddersen | ......... | G06K 7/10653 235/462.43 |
| 8,113,428 B2 * | 2/2012 | Rudeen | ..................... | G06K 7/14 235/462.07 |
| 10,067,355 B1 * | 9/2018 | Handshaw | .............. | F21V 13/02 |
| 2005/0284942 A1 * | 12/2005 | Gurevich | ........... | G06K 7/10544 235/462.21 |
| 2006/0118635 A1 * | 6/2006 | Joseph | ..................... | G06K 7/10 235/462.24 |
| 2006/0261167 A1 * | 11/2006 | Ray | .................... | G06K 7/10851 235/462.08 |
| 2012/0261474 A1 * | 10/2012 | Kawashime | ......... | G02B 26/005 235/462.24 |

(Continued)

OTHER PUBLICATIONS

International Search Report and Written Opinion for International Application No. PCT/US2020/052823 dated Dec. 22, 2020.

*Primary Examiner* — Sonji N Johnson
(74) *Attorney, Agent, or Firm* — Yuri Astvatsaturov

(57) ABSTRACT

Example methods and apparatus to provide radial aiming patterns are disclosed herein. An example assembly includes an imaging assembly configured to capture an image of a portion of an environment in a field of view (FOV); and an aiming light generator configured to form an illuminated radial aiming pattern and present the illuminated radial aiming pattern to enable the portion of the environment to be positioned within the FOV, the illuminated radial aiming pattern including an illuminated central mark in a central area of the illuminated radial aiming pattern, an illuminated first line, an illuminated second line, an illuminated third line, and an illuminated fourth line, wherein the first line, the second line, the third line, and the fourth line extend outward from the central mark and are angularly distributed about the central mark.

28 Claims, 4 Drawing Sheets

(56) References Cited

U.S. PATENT DOCUMENTS

| | | | |
|---|---|---|---|
| 2015/0294128 A1* | 10/2015 | Kawashima | G06K 7/10544 235/454 |
| 2018/0260594 A1* | 9/2018 | McQueen | G06K 7/10722 |
| 2019/0104241 A1 | 4/2019 | Handshaw et al. | |
| 2019/0130150 A1* | 5/2019 | Handshaw | G06K 7/10722 |
| 2021/0132403 A1* | 5/2021 | Filhaber | G02B 5/0257 |

* cited by examiner

METHODS AND APPARATUS TO PROVIDE RADIAL AIMING PATTERNS

BACKGROUND

The present disclosure relates generally to imaging readers for, and a method of, reading a target, such as a barcode symbol, to be electro-optically read by image capture over a field of view (FOV) in a range of working distances away from the module/reader, and, more particularly, to methods and apparatus to provide radial aiming light patterns to substantially center the target in the FOV, especially in a field crowded with targets, and, still more particularly, to enhancing the visibility of the aiming mark to serve as a more prominent visual indicator of the FOV.

Solid-state imaging readers have long been used, in both handheld and hands-free modes of operation, in many industries, such as machine vision, retail, manufacturing, warehousing, distribution, postal, transportation, logistics, etc., to electro-optically read targets, such as one- or two-dimensional barcode symbols to be decoded. A known imaging reader generally includes an imaging module that is mounted in a housing, and that has an aiming light system for projecting a visible aiming light pattern to visually locate a target within a FOV and, thus, advise an operator or computer system which way the reader is to be moved in order to position the aiming light pattern on the target, typically at a center thereof, prior to reading. Traditional rectangular and/or grid-based aiming patterns do not in some instances, intersect items of interest, indicate the direction to move to center an item of interest in a FOV and/or show the extents (e.g., corners) of the FOV. The imaging module includes an illumination system for emitting illumination light toward the target for reflection and scattering therefrom, and an imaging system having a solid-state imager with a sensor array of photocells or light sensors, and an optical assembly for capturing return illumination light scattered and/or reflected from the target being imaged over the field of view centered on an imaging axis, and for projecting the captured illumination light onto the imager to initiate capture of an image of the target. The imager produces electrical signals that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

SUMMARY

In an embodiment, an assembly includes: an imaging assembly configured to capture an image of a portion of an environment in a FOV; and an aiming pattern generator configured to form an illuminated radial aiming pattern and present the illuminated radial aiming pattern to enable the portion of the environment to be positioned within the FOV, the illuminated radial aiming pattern including an illuminated central mark in a central area of the illuminated radial aiming pattern, an illuminated first line, an illuminated second line, an illuminated third line, and an illuminated fourth line, wherein the first line, the second line, the third line, and the fourth line extend outward from the central mark and are angularly distributed about the central mark.

In another embodiment, an assembly includes: an imaging assembly configured to capture an image of a portion of an environment in a FOV; and an aiming pattern generator configured to form an illuminated radial aiming pattern and present the illuminated radial aiming pattern to enable the portion of the environment to be positioned within the FOV, the illuminated radial aiming pattern including an illuminated central mark in a central area of the illuminated radial aiming pattern, an illuminated first line, an illuminated second line, an illuminated third line, and an illuminated fourth line, wherein the first line, the second line, the third line, and the fourth line extend outward from the central mark and are angularly distributed about the central mark.

In yet another embodiment, an assembly for capturing an image of an environment in a FOV, the assembly includes: an aiming pattern generator configured to form a radially-extending light pattern to designate approximate boundaries of the FOV, the radially-extending light pattern including eight or more illuminated lines extending radially from a central portion of the radially-extending light pattern, the illuminated lines angularly distributed about the central portion; and an imaging assembly configured to capture an image of the environment in the FOV.

In still another embodiment, an assembly for capturing an image of an environment in a FOV, the assembly includes: an aiming pattern generator configured to form a radial aiming light pattern that represents boundaries of the FOV, the radial aiming light pattern including a central aiming mark in a central area of the aiming light pattern, a first illuminated line, the first illuminated line having a first portion extending from a first side of the central aiming mark, and a second portion extending from a second side of the central aiming mark, the second side diametrically opposed the first side, a second illuminated line orthogonal to the first illuminated line, the second illuminated line having a third portion extending from a third side of the central aiming mark, and a fourth portion extending from a fourth side of the central aiming mark, the fourth side diametrically opposed the third side, and a third illuminated line between the first illuminated line and the second illuminated line, the third illuminated line having a fifth portion extending from a fifth side of the central aiming mark, and a sixth portion extending from a sixth side of the central aiming mark, the sixth side diametrically opposed the fifth side; and an imaging assembly configured to capture an image of the environment in the FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
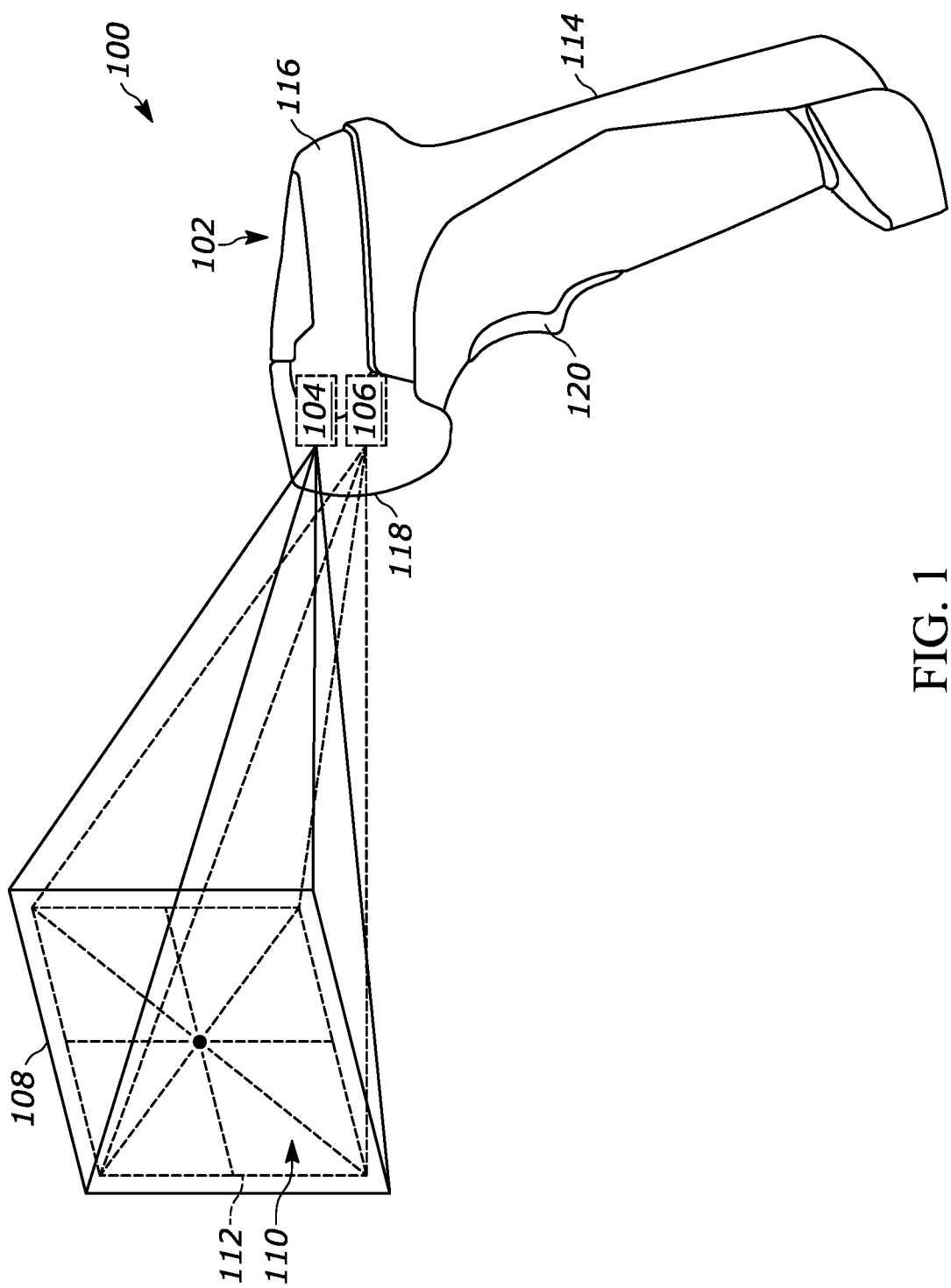
FIG. 1 illustrates a perspective view of an example embodiment of an electro-optical handheld reader for reading targets by image capture including an aiming pattern generator in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed example radial aiming patterns overcome at least some of the above deficiencies of traditional aiming patterns. Disclosed example radial aiming patterns include a plurality of illuminated radial lines that emanate from a central mark, portion or feature (e.g., a bright dot) of the pattern. The radial lines can be implemented as solid, dashed, dotted, etc. depending on available optical power. The number of radial lines can be selected based on a desired density of coverage and/or available optical power. Disclosed example radial aiming patterns disclosed herein improve upon traditional aiming patterns by providing at least one or more of, indication(s) of the limits of an imaging FOV, indication(s) of whether an object (e.g., a barcode) is within an imaging FOV, indication(s) of whether the object is located at the center of the imaging FOV, indication(s) of the direction(s) to move toward the center of the imaging FOV, a center of the aiming pattern that is visible in bright ambient light. Disclosed examples can also be used to reduce required input laser power and provide lower sensitivity of power distribution to production tolerances for reliable eye safety compliance at high brightness of the aiming pattern. Further, disclosed radial aiming patterns can be implemented using diffractive optical elements (DOE), multi-segment refractive optical elements (ROE), etc. that provide clear aiming patterns having less diffractive artifacts and/or improve eye safety compliance. Eye safety compliance depends on, among possibly other things, the sensitivity of power distribution among the elements of an aiming pattern due to production tolerances. In case of DOE, disclosed aiming patterns minimize the total length of the illuminated lines, thus, reducing potential re-distribution of optical power from the illuminated lines to the central mark (zero diffraction order). In case of multi-segment ROE, power distribution between central mark and the illuminated lines is determined by relative area of various segments, which does not depend on production tolerances.

Reference will now be made in detail to non-limiting examples, some of which are illustrated in the accompanying drawings.

FIG. 1 illustrates an example handheld imaging reader 100 configured to, among possibly other things, electro-optically read targets, such as barcode symbols, indicia or the like. The handheld imaging reader 100 includes an example housing 102 in which an imaging module 104 and an example aiming pattern generator 106 in accordance with aspects of this disclosure are mounted. The imaging module 104 reads targets in an imaging FOV 108, and the aiming pattern generator 106 generates an illuminated aiming pattern 110 in an aiming zone 112. The imaging FOV 108 and the aiming zone 112 may be, but need not be the same. For example, the aiming zone 112 may intentionally be smaller than the imaging FOV 108 to accommodate inaccuracies in imaging reader 100 handling. However, in general, the aiming zone 112 is intended to depict, represent, approximate, indicate, etc. the metes and bounds of the imaging FOV 108 to a user.

The housing 102 includes an example generally elongated handle or lower handgrip portion 114 and a barrel or upper body portion or top 116 having a front end at which a light-transmissive window 118 is located. The cross-sectional dimensions and overall size of the handle 114 are such that the reader 100 can conveniently be held in an operator's hand. The body and handle portions 114, 116 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of this reader 100. A manually actuatable trigger 120 is mounted in a moving relationship on the handle 114 in a forward-facing region of the reader 100. An operator's finger can be used to actuate the trigger 120 to read the target by depressing the trigger 120 once the target(s) fall within the illuminated aiming zone 112, which represents the imaging FOV 108. Although the housing 102 is illustrated as a portable, point-of-transaction, gun-shaped, handheld housing, any other configuration including a hands-free configuration could be used.

Further, a machine vision system may be implemented in accordance with aspects of the handheld imaging reader 100. For example, a processor (e.g., see FIG. 8) of the machine vision system can be used to control a conveyor, an assembly line, etc. until one or more targets to be read fall within the aiming zone 112, and then automatically trigger reading of the target(s) by the imaging module 104.

While an example handheld imaging reader 100 is illustrated in FIG. 1, one or more of the aspects illustrated in FIG. 1 may be combined, divided, re-arranged, omitted, eliminated and/or implemented in any other way. Further, the handheld imaging reader 100 may include one or more aspects in addition to, or instead of, those illustrated in FIG. 1, and/or may include more than one of any or all of the illustrated aspects. For example, the handheld imaging reader 100 may be in wired or wireless communication with a computing system or server.

Figure 2:
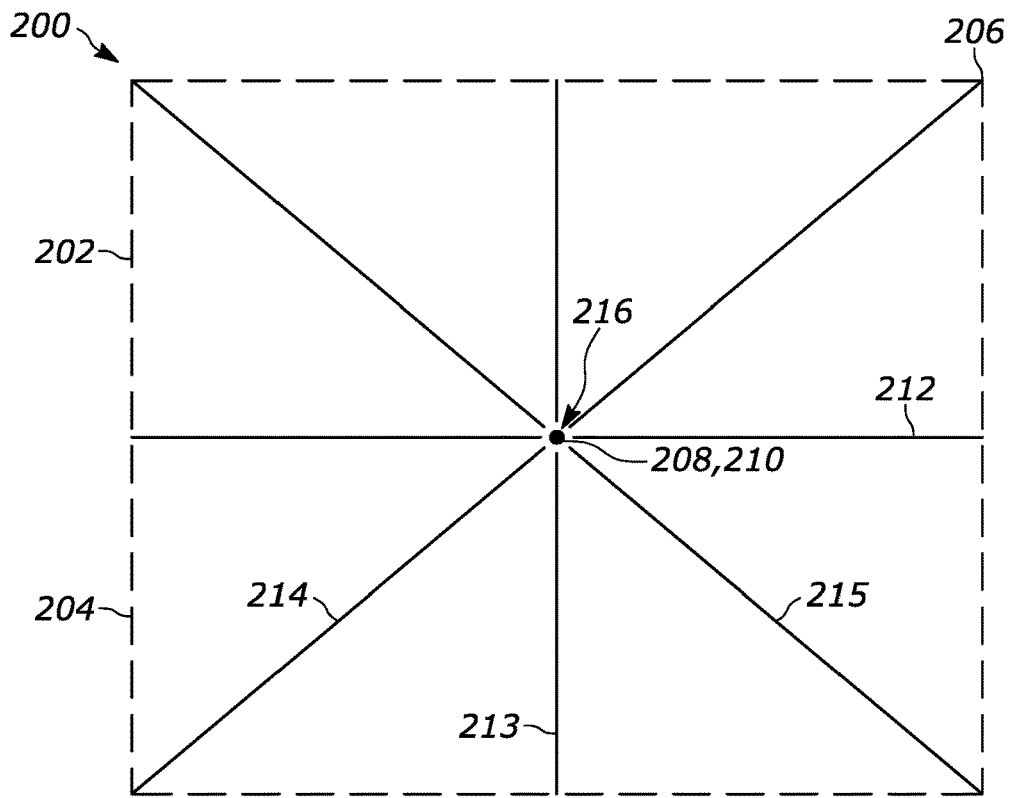
FIG. 2 illustrates an example radial aiming pattern in accordance with this disclosure.
Figure 3:
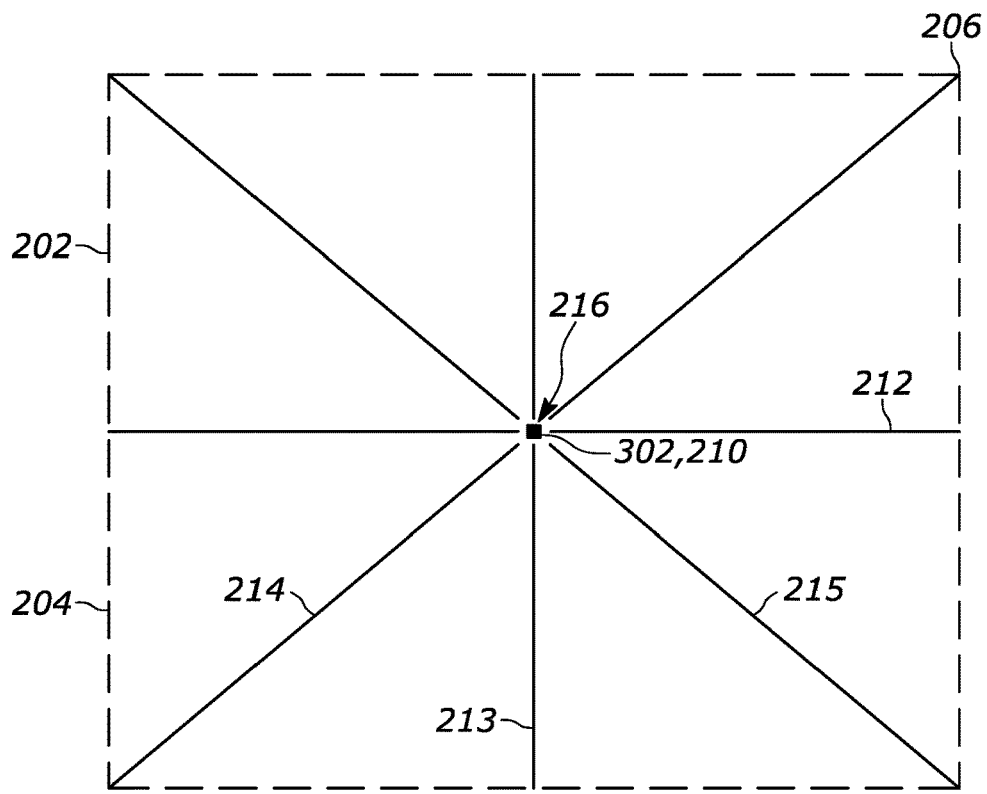
FIG. 3 illustrates another example radial aiming pattern in accordance with this disclosure.
Figures 4, 5, 6, 7:
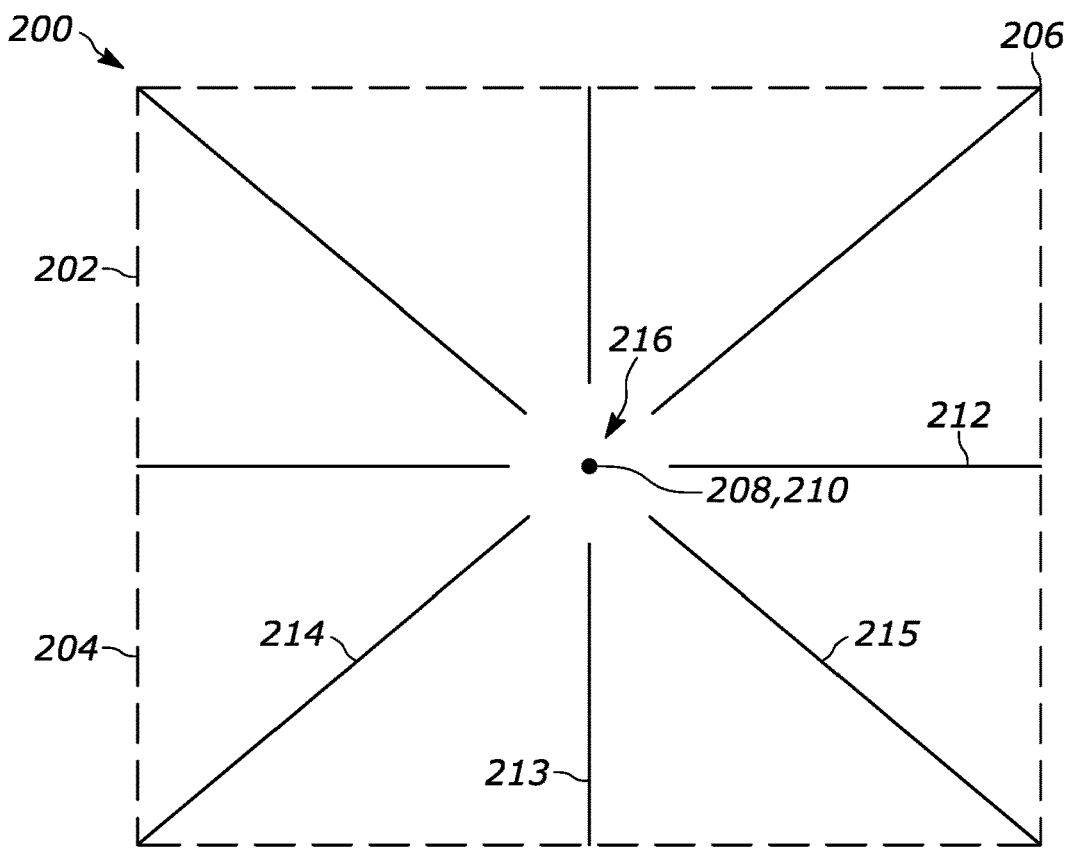
FIG. 4 illustrates yet another example radial aiming pattern in accordance with this disclosure.
FIGS. 5, 6 and 7 illustrate example illuminated line types in accordance with this disclosure.

FIG. 2 illustrates an example illuminated aiming pattern 200 that can be used to implement the illuminated aiming pattern 110 of FIG. 1. The example illuminated aiming pattern 200 defines an aiming zone 202. The illuminated aiming pattern 200 defines edges of the aiming zone 202 (one of which is designated at reference numeral 204) and corners of the aiming zone 202 (one of which is designated at reference numeral 206). The example illuminated aiming pattern 200 includes a central illuminated mark 208 in a central portion 210 of the pattern 200 and a plurality of radially arranged illuminated lines 212, 213, 214 and 215. In other words, the illuminated lines 212-215 are radially distributed (e.g., space apart by a generally equally angle). The illuminated lines 212-215 extend between opposite edges 204 and/or corners 206. As shown in FIG. 2, the illuminated lines 212-215 have a portion 216 (e.g., a discontinuity, a gap, etc.) that is not illuminated that overlaps the central illuminated mark 208. Accordingly, the central illuminated mark 208 can be made to be distinguished from the illuminated lines 212-215. The central illuminated mark 208 may have any of a variety of shapes such as, but not limited to, a round dot, a rectangular dot, a square dot 302 (e.g., see FIG. 3), a cross mark, etc. Central marks need not be solid shapes, and need not to be symmetric. Each of the illuminated lines 212-215 includes two portions that extend radially outward from opposite or diametrically opposed sides of the central illuminated mark 208. For example, the illuminated line 212 has two illuminated line portions 212A and 212B that emanate from opposite sides of the central illuminated mark 208. The illuminated line portions 212A-21B are radially distributed and extend from the central illuminated mark 208 to an edge 204 and/or a corner 206 of the aiming zone 202. Illuminated aiming patterns having different distances between the central illuminated mark 208 and the illuminated lines 212-215 and/or illuminated line portions 212A-B may be implemented (e.g., see FIG. 4). The illuminated lines 212-215 and the illuminated line portions 212A-212B may be any type of line such as, but not limited to, a solid line (see FIG. 5), a dotted line (see FIG. 6), a dashed line (see FIG. 7), etc. While four illuminated lines 212-215 are shown in FIG. 2, more lines may be included based on a desired density of coverage and/or available optical power.

The central illuminated mark 208, the illuminated lines 212-215 and the illuminated line portions 212A-218B can be formed by passing light generated by a light source (e.g., a laser) through one or more DOEs and/or one or more multi-segment ROEs that provide clear aiming pattern elements that reduce diffractive artifacts and/or improve eye safety compliance. Eye safety compliance depends on, among possibly other things, sensitivity of power distribution among the elements of an aiming pattern due to production tolerances. In some examples of DOE, proposed aiming patterns minimize the total length of the illuminated lines 212-215 and/or illuminated line portions 212A-B, thus, reducing potential re-distribution of optical power from the illuminated lines 212-215 and/or illuminate into the central illuminated mark 208 (zero diffraction order). In some examples of multi-segment ROE, power distribution between central mark 208 and the illuminated lines 212-215, 212A-B is determined by relative area of various segments, and does not depend on production tolerances.

While an example illuminated aiming pattern 200 is illustrated in FIG. 2, one or more of the aspects illustrated in FIG. 2 may be combined, divided, re-arranged, omitted, eliminated and/or implemented in any other way. For example, aiming zone 202 having different shapes (e.g., round, square, rectangle, etc.) may be implemented. Further, the illuminated aiming pattern 200 may include one or more aspects in addition to, or instead of, those illustrated in FIG. 1, and/or may include more than one of any or all of the illustrated aspects. For examples, more illuminated lines 212-215 and/or more illuminated line portions 212A-212B may be included in an illuminated aiming pattern 200.

Figure 8:
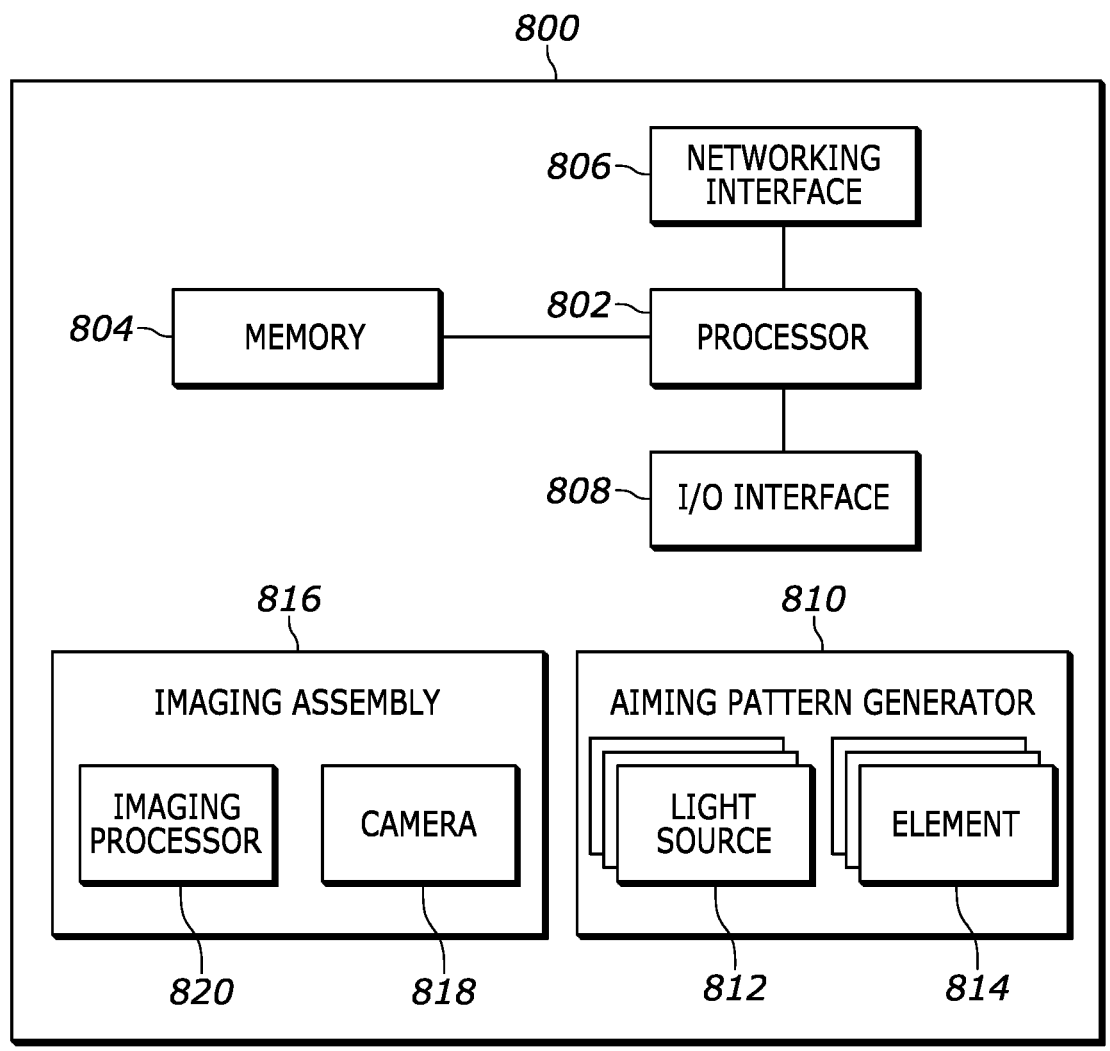
FIG. 8 is a block diagram of an example logic circuit for implementing example methods and/or operations described herein.

FIG. 8 is a block diagram representative of an example logic circuit capable of implementing, for example, one or more components of the example imaging module 104 and the example aiming pattern generator 106 of FIG. 1 or, more generally, the example handheld imaging reader 100 of FIG. 1 and/or a machine vision system based thereon. The example logic circuit of FIG. 8 is a processing platform 800 capable of executing instructions to, for example, implement operations of the example methods described herein. Other example logic circuits capable of, for example, implementing operations of the example methods described herein include field programmable gate arrays (FPGAs) and application specific integrated circuits (ASICs).

The example processing platform 800 of FIG. 8 includes a processor 802 such as, for example, one or more microprocessors, controllers, and/or any suitable type of processor. The example processing platform 800 of FIG. 8 includes any number or types of non-transitory memory (e.g., volatile memory, non-volatile memory, etc.) 804 and/or storage devices accessible by the processor 802 (e.g., via a memory controller) in which information may be stored for any duration (e.g., permanently, for an extended time period, for a brief instance, for temporarily buffering, for caching of the information, etc.). The example processor 802 interacts with the memory 804 to obtain, for example, machine-readable instructions stored in the memory 804 corresponding to, for example, the operations disclosed herein. Additionally or alternatively, machine-readable instructions corresponding to the example operations described herein may be stored on one or more removable media (e.g., an optical storage drive, a compact disc, a digital versatile disk, a removable flash memory, etc.) that may be coupled to the processing platform 800 to provide access to the machine-readable instructions stored thereon.

The example processing platform 800 of FIG. 8 also includes a network interface 806 to enable communication with other machines via, for example, one or more networks. The example network interface 806 includes any suitable type of communication interface(s) (e.g., wired and/or wireless interfaces) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a cable modem, a digital subscriber line (DSL) modem, a dialup modem, or any other suitable communication protocols or standards.

The example processing platform 800 of FIG. 8 also includes input/output (I/O) interfaces 808 (e.g., the trigger 120) to enable receipt of user input and communication of output data to the user. The I/O interfaces 808 may include any number and/or type(s) of different types of I/O circuits or components that enable the processor 802 to communicate with peripheral I/O devices. Example I/O interfaces 808 include a universal serial bus (USB), a Bluetooth® interface, a near field communication (NFC) interface, and/or an infrared transceiver. The peripheral I/O devices may be any desired type of I/O device such as a keyboard, a display, a navigation device (e.g., a mouse, a trackball, a capacitive touch pad, a joystick, etc.), a speaker, a microphone, a printer, a button, etc.

To generate illuminated aiming patterns such as the pattern 110 of FIG. 1 and/or the pattern 200 of FIG. 2, the example processing platform 800 includes an example aiming pattern generator 810. The aiming pattern generator 810 includes one or more light sources 812 (e.g., lasers, light emitting diodes (LEDs), etc.) and one or more elements 814 (one or more DOEs and/or one or more multi-segment ROEs). The light source(s) 812 generate light that is passed through the element(s) 814 to provide clear aiming pattern elements (e.g., the central illuminated mark 208, the illuminated line(s) 212-215 and/or the illuminated line portions 212A-B) that reduce diffractive artifacts and/or improve eye safety compliance. Eye safety compliance depends on, among possibly other things, sensitivity of power distribution among the elements of an aiming pattern due to production tolerances. In case of DOE, proposed aiming patterns minimize the total length of the illuminated lines 212-215 and/or illuminated line portions 212A-B, thus, reducing potential re-distribution of optical power from the illuminated lines 212-215 and/or illuminate into the central mark 208 (zero diffraction order). In case of multi-segment ROE, power distribution between central mark 208 and the illuminated lines 212-215, 212A-B is determined by relative area of various segments, which does not depend on production tolerances.

To capture images of the imaging FOV 108, the example processing platform 800 includes an imaging assembly 816 having any number and/or type(s) of cameras 818 and an image processor 820. The camera 818 under control of, for example, the image processor 820 captures images of the portion of environment in which the processing platform 800 is operating that falls within an imaging FOV. When targets are barcodes, the image processor 820 can detect and/or decode barcodes. In some examples, the image processor 820 is implemented by the processor 802.

In operation, the aiming pattern generator 810 generates and outputs an illuminated aiming pattern (e.g., the pattern 200 of FIG. 2) for use by an operator to manually orient the handheld imaging reader 100 toward a target (e.g., to position the target within an imaging FOV represented by the pattern). When, for example, the manual actuatable trigger 120 is actuated (e.g., depressed) by an operator's finger (e.g., when the user recognizes that target(s) falls within an illuminated aiming zone), the image processor 820 or, more generally, the processor 802 triggers the camera 818 to capture an image of the target(s). For an example machine vision application, the processor 802 controls a conveyor, an assembly line, etc. while the image processor 820 or, more generally, the processor 802 processes successive images captured by the camera 818 of the imaging FOV 108 until one or more targets fall within the imaging FOV 108, and then captures or retains an image of the target(s). In some examples, the image processor 820 or, more generally, the processor 802 estimates a location of a target (e.g., a barcode) in the imaging FOV 108, or a focus distance for the target based on an image of the illuminated aiming pattern 110 in the imaging FOV 108, and the camera 818 captures an image of the target based on at least one of the location of the target or the focus distance. In some examples, the image processor 820 or, more generally, the processor 802 estimates the location of the barcode in the imaging FOV 108 by determining a parallax of the illuminated radial aiming pattern 110 (e.g., when the aiming pattern generator 810 is not pointed directly at a target).

Aspects of the processing platform 800 may, in some examples, be implemented separately. For example, the aiming pattern generator 810 and the imaging assembly 816 may be implemented in the handheld imaging reader 100 which is in communication with a computing system, server, etc. that is separate from the handheld imaging reader 100 via the I/O interfaces 808 and/or the network interface 806.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and/or represented by the flowcharts of this disclosure, if such are present). Some example logic circuits include a combination of specifically configured hardware and hardware that executes machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

Example methods and apparatus to provide radial aiming patterns are disclosed herein. Further examples and combinations thereof include at least the following.

Example 1 is an assembly, comprising: an imaging assembly configured to capture an image of a portion of an environment in a field of view (FOV); and an aiming pattern generator configured to form an illuminated radial aiming pattern and present the illuminated radial aiming pattern to enable the portion of the environment to be positioned within the FOV, the illuminated radial aiming pattern including an illuminated central mark in a central area of the illuminated radial aiming pattern, an illuminated first line, an illuminated second line, an illuminated third line, and an illuminated fourth line, wherein the first line, the second line, the third line, and the fourth line extend outward from the central mark and are angularly distributed about the central mark.

Example 2 is the assembly of example 1, wherein a first end of the first line identifies a vicinity of a first virtual edge of the FOV, a second end of the second line identifies a vicinity of a second virtual edge of the FOV, and the third end of the third line identifies a vicinity of a virtual corner of the FOV at an intersection of the first virtual edge and the second virtual edge.

Example 3 is the assembly of example 1 or example 2, wherein the first line, the second line, the third line, and the fourth line have a respective non-illuminated portion in a vicinity of the central mark.

Example 4 is the assembly of any of examples 1 to 3, wherein the aiming pattern generator includes a first light source to form the first line, and a second light source to form the second line.

Example 5 is the assembly of any of examples 1 to 4, wherein each of the first illuminated line, the second illuminated line, the third illuminated line and the fourth illuminated line is at least one of a solid line, a dashed line, or a dotted line.

Example 6 is the assembly of any of examples 1 to 5 wherein the central aiming mark includes a prominent visual indicator of a center zone of the FOV that is distinct from the first illuminated line, the second illuminated line and the third illuminated line.

Example 7 is the assembly of any of examples 1 to 6, wherein the assembly includes a handheld imaging reader including a trigger configured to be activated by a user to trigger the imaging assembly to capture the image when the user detects the portion of the environment in the FOV based on the illuminated radial aiming pattern.

Example 8 is the assembly of any of examples 1 to 7, further including a machine vision system configured to: identify when the portion of the environment is in the FOV based on the illuminated radial aiming pattern; and trigger the imaging assembly to capture the image when the machine vision system identifies the portion of the environment in the FOV.

Example 9 is the assembly of any of examples 1 to 8, wherein the imaging assembly includes: an image processor configured to estimate a location of a barcode in the FOV or a focus distance for the barcode based on the illuminated radial aiming pattern; and a camera configured to capture an image of the barcode based on at least one of the barcode location or the focus distance.

Example 10 is the assembly of example 9, wherein the image processor is configured to estimate the location of the barcode in the FOV by determining a parallax of the illuminated radial aiming pattern.

Example 11 is the assembly of example 10, wherein the image processor is configured to a focus distance for the barcode based on the parallax.

Example 12 is the assembly of any of examples 1 to 11, further including a decoder to detect a presence of a barcode in the image or in the FOV.

Example 13 is the assembly of any of examples 1 to 12, wherein the aiming pattern generator includes: at least one of a diffractive optical element, a refractive optical element, or an aperture; and a light source to generate light that at least partially passes through the at least one of the diffractive optical element, the refractive optical element, or the aperture to form the illuminated first line.

Example 14 is an assembly, comprising: an imaging assembly configured to capture an image of a portion of an environment in a field of view (FOV); and an aiming pattern generator configured to form an illuminated radial aiming pattern and present the illuminated radial aiming pattern to enable the portion of the environment to be positioned within the FOV, the illuminated radial aiming pattern including an illuminated central mark in a central area of the illuminated radial aiming pattern, an illuminated first line, an illuminated second line, an illuminated third line, and an illuminated fourth line, wherein the first line, the second line, the third line, and the fourth line extend outward from the central mark and are angularly distributed about the central mark.

Example 15 is the assembly of example 14, wherein a first end of the first line identifies a vicinity of a first virtual edge of the FOV, a second end of the second line identifies a vicinity of a second virtual edge of the FOV, and a third end of the third line identifies a vicinity of a virtual corner of the FOV at an intersection of the first virtual edge and the second virtual edge.

Example 16 is the assembly of example 14 or example 15, wherein the first line, the second line, the third line, and the fourth line have a respective non-illuminated portion in a vicinity of the central mark.

Example 17 is an assembly for capturing an image of an environment in a field of view (FOV), the assembly comprising: an aiming pattern generator configured to form a radially-extending light pattern to designate approximate boundaries of the FOV, the radially-extending light pattern including eight or more illuminated lines extending radially from a central portion of the radially-extending light pattern, the illuminated lines angularly distributed about the central portion; and an imaging assembly configured to capture an image of the environment in the FOV.

Example 18 is the assembly of example 17, wherein the radially-extending aiming light pattern includes a central aiming mark in the central portion, and wherein the illuminated lines are spaced apart from the central aiming mark.

Example 19 is the assembly of example 17 or example 18, wherein a first illuminated line identifies a vicinity of a first virtual edge of the FOV, a second illuminated line identifies a vicinity of a second virtual edge of the FOV, and a third illuminated line identifies a vicinity of a virtual corner of the FOV at an intersection of the first virtual edge and the second virtual edge.

Example 20 is an assembly for capturing an image of an environment in a field of view (FOV), the assembly comprising: an aiming pattern generator configured to form a radial aiming light pattern that represents boundaries of the FOV, the radial aiming light pattern including: a central aiming mark in a central area of the aiming light pattern, a first illuminated line, the first illuminated line having a first portion extending from a first side of the central aiming mark, and a second portion extending from a second side of the central aiming mark, the second side diametrically opposed the first side, a second illuminated line orthogonal to the first illuminated line, the second illuminated line having a third portion extending from a third side of the central aiming mark, and a fourth portion extending from a fourth side of the central aiming mark, the fourth side diametrically opposed the third side, and a third illuminated line between the first illuminated line and the second illuminated line, the third illuminated line having a fifth portion extending from a fifth side of the central aiming mark, and a sixth portion extending from a sixth side of the central aiming mark, the sixth side diametrically opposed the fifth side; and an imaging assembly configured to capture an image of the environment in the FOV.

Example 21 is the assembly of example 20, wherein each of the first illuminated line, the second illuminated line, the third illuminated line and the fourth illuminated line is at least one of a solid line, a dashed line, or a dotted line.

Example 22 is the assembly of example 20 or example 21, wherein respective ends of the first portion, the second portion, the third portion, the fourth portion, the fifth portion and the sixth portion intersect the central aiming mark.

Example 23 is the assembly of any of examples 20 to 22, wherein respective ends of the first portion, the second portion, the third portion, the fourth portion, the fifth portion and the sixth portion are spaced apart from the central aiming mark.

Example 24 is the assembly of examples 20 to 23, wherein the central aiming mark includes a prominent visual indicator of a center zone of the FOV that is distinct from the first illuminated line, the second illuminated line and the third illuminated line.

Example 25 is the assembly of examples 20 to 24, wherein the first portion extends outward from the central aiming mark to identify a vicinity of a first virtual edge of the FOV, the third portion extends outward from the central aiming mark to identify a vicinity of a second virtual edge of the FOV, and the fifth portion extends outward from the central aiming mark out to identify a vicinity of a virtual corner of the FOV at an intersection of the first virtual edge and the second virtual edge.

Example 26 is the assembly of examples 20 to 25, wherein the aiming light pattern includes a fourth illuminated line having a seventh portion extending from a seventh side of the central aiming mark between the second portion and the third portion, and an eighth portion extending from an eighth side of the central aiming mark, the eighth side diametrically opposed the seventh side.

Example 27 is a method for capturing an image of an environment in a field of view (FOV), the method comprising: forming a radial aiming light pattern corresponding to the FOV, the pattern including a central illuminated mark in a central area of the pattern, a first illuminated line, a second illuminated line, a third illuminated line, and a fourth illuminated line, wherein the first illuminated line, the second illuminated line, the third illuminated line, and the fourth illuminated line extend outward from the central aiming mark and are angularly distributed about the central aiming mark; and when a capture trigger is activated, capturing an image of the environment in the FOV.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. An assembly, comprising:
   an imaging assembly configured to capture an image of a portion of an environment in a field of view (FOV); and
   an aiming pattern generator configured to form an illuminated radial aiming pattern and project the illuminated radial aiming pattern onto an object in the environment to enable the object to be positioned within the FOV, the illuminated radial aiming pattern including:
      an illuminated central mark in a central area of the illuminated radial aiming pattern,
      an illuminated first line,
      an illuminated second line,
      an illuminated third line, and
      an illuminated fourth line, wherein the first line, the second line, the third line, and the fourth line extend outward from the central mark and are angularly distributed about the central mark.

2. The assembly of claim 1, wherein a first end of the first line identifies a vicinity of a first virtual edge of the FOV, a second end of the second line identifies a vicinity of a second virtual edge of the FOV, and the third end of the third line identifies a vicinity of a virtual corner of the FOV at an intersection of the first virtual edge and the second virtual edge.

3. The assembly of claim 1, wherein the first line, the second line, the third line, and the fourth line have a respective non-illuminated portion in a vicinity of the central mark.

4. The assembly of claim 1, wherein the aiming pattern generator includes a first light source to form the first line, and a second light source to form the second line.

5. The assembly of claim 1, wherein each of the first illuminated line, the second illuminated line, the third illuminated line and the fourth illuminated line is at least one of a solid line, a dashed line, or a dotted line.

6. The assembly of claim 1, wherein the central aiming mark includes a prominent visual indicator of a center zone of the FOV that is distinct from the first illuminated line, the second illuminated line and the third illuminated line.

7. The assembly of claim 1, wherein the assembly includes a handheld imaging reader including a trigger configured to be activated by a user to trigger the imaging assembly to capture the image when the user detects the portion of the environment in the FOV based on the illuminated radial aiming pattern.

8. The assembly of claim 1, further including a machine vision system configured to:
   identify when the portion of the environment is in the FOV based on the illuminated radial aiming pattern; and
   trigger the imaging assembly to capture the image when the machine vision system identifies the portion of the environment in the FOV.

9. The assembly of claim 1, wherein the imaging assembly includes:
   an image processor configured to estimate a location of a barcode in the FOV or a focus distance for the barcode based on the illuminated radial aiming pattern; and
   a camera configured to capture an image of the barcode based on at least one of the barcode location or the focus distance.

10. The assembly of claim 9, wherein the image processor is configured to estimate the location of the barcode in the FOV by determining a parallax of the illuminated radial aiming pattern.

11. The assembly of claim 10, wherein the image processor is configured to a focus distance for the barcode based on the parallax.

12. The assembly of claim 1, further including a decoder to detect a presence of a barcode in the image or in the FOV.

13. The assembly of claim 1, wherein the aiming pattern generator includes:
   at least one of a diffractive optical element, a refractive optical element, or an aperture; and
   a light source to generate light that at least partially passes through the at least one of the diffractive optical element, the refractive optical element, or the aperture to form the illuminated first line.

14. The assembly of claim 1, wherein the assembly is a handheld scanner having a housing with a front-facing opening, wherein the front-facing opening is configured to face away from a user when the user has the handheld scanner in a handheld position, and wherein the aiming pattern generator projects the illuminated aiming pattern onto the object through the front-facing opening.

15. An assembly, comprising:
   an imaging assembly configured to capture an image of a portion of an environment in a field of view (FOV); and
   an aiming pattern generator configured to form an illuminated radial aiming pattern and project the illuminated radial aiming pattern onto an object in the environment to enable the object to be positioned within the FOV, the illuminated radial aiming pattern including:
      an illuminated central mark in a central area of the illuminated radial aiming pattern,
      an illuminated first line,
      an illuminated second line,
      an illuminated third line, and
      an illuminated fourth line, wherein the first line, the second line, the third line, and the fourth line extend outward from the central mark and are angularly distributed about the central mark.

16. The assembly of claim 15, wherein a first end of the first line identifies a vicinity of a first virtual edge of the FOV, a second end of the second line identifies a vicinity of a second virtual edge of the FOV, and a third end of the third line identifies a vicinity of a virtual corner of the FOV at an intersection of the first virtual edge and the second virtual edge.

17. The assembly of claim 15, wherein the first line, the second line, the third line, and the fourth line have a respective non-illuminated portion in a vicinity of the central mark.

18. An assembly for capturing an image of an environment in a field of view (FOV), the assembly comprising:
- an aiming pattern generator configured to form a radially-extending light pattern to designate approximate boundaries of the FOV, and to project the light pattern onto the environment, the radially-extending light pattern including eight or more illuminated lines extending radially from a central portion of the radially-extending light pattern, the illuminated lines angularly distributed about the central portion; and
- an imaging assembly configured to capture an image of the environment in the FOV.

19. The assembly of claim 18, wherein the radially-extending aiming light pattern includes a central aiming mark in the central portion, and wherein the illuminated lines are spaced apart from the central aiming mark.

20. The assembly of claim 18, wherein a first illuminated line identifies a vicinity of a first virtual edge of the FOV, a second illuminated line identifies a vicinity of a second virtual edge of the FOV, and a third illuminated line identifies a vicinity of a virtual corner of the FOV at an intersection of the first virtual edge and the second virtual edge.

21. An assembly for capturing an image of an environment in a field of view (FOV), the assembly comprising:
- an aiming pattern generator configured to form a radial aiming light pattern that represents boundaries of the FOV, and to project the light pattern onto the environment, the radial aiming light pattern including:
  - a central aiming mark in a central area of the aiming light pattern,
  - a first illuminated line, the first illuminated line having a first portion extending from a first side of the central aiming mark, and a second portion extending from a second side of the central aiming mark, the second side diametrically opposed the first side,
  - a second illuminated line orthogonal to the first illuminated line, the second illuminated line having a third portion extending from a third side of the central aiming mark, and a fourth portion extending from a fourth side of the central aiming mark, the fourth side diametrically opposed the third side, and
- a third illuminated line between the first illuminated line and the second illuminated line, the third illuminated line having a fifth portion extending from a fifth side of the central aiming mark, and a sixth portion extending from a sixth side of the central aiming mark, the sixth side diametrically opposed the fifth side; and
- an imaging assembly configured to capture an image of the environment in the FOV.

22. The assembly of claim 21, wherein each of the first illuminated line, the second illuminated line, the third illuminated line and the fourth illuminated line is at least one of a line, a dashed line, or a dotted line.

23. The assembly of claim 21, wherein respective ends of the first portion, the second portion, the third portion, the fourth portion, the fifth portion and the sixth portion intersect the central aiming mark.

24. The assembly of claim 21, wherein respective ends of the first portion, the second portion, the third portion, the fourth portion, the fifth portion and the sixth portion are spaced apart from the central aiming mark.

25. The assembly of claim 21, wherein the central aiming mark includes a prominent visual indicator of a center zone of the FOV that is distinct from the first illuminated line, the second illuminated line and the third illuminated line.

26. The assembly of claim 21, wherein the first portion extends outward from the central aiming mark to identify a vicinity of a first virtual edge of the FOV, the third portion extends outward from the central aiming mark to identify a vicinity of a second virtual edge of the FOV, and the fifth portion extends outward from the central aiming mark out to identify a vicinity of a virtual corner of the FOV at an intersection of the first virtual edge and the second virtual edge.

27. The assembly of claim 21, wherein the aiming light pattern includes a fourth illuminated line having a seventh portion extending from a seventh side of the central aiming mark between the second portion and the third portion, and an eighth portion extending from an eighth side of the central aiming mark, the eighth side diametrically opposed the seventh side.

28. A method for capturing an image of an environment in a field of view (FOV), the method comprising:
- forming a radial aiming light pattern corresponding to the FOV, the pattern including:
  - a central illuminated mark in a central area of the pattern,
  - a first illuminated line,
  - a second illuminated line,
  - a third illuminated line, and
  - a fourth illuminated line, wherein the first illuminated line, the second illuminated line, the third illuminated line, and the fourth illuminated line extend outward from the central aiming mark and are angularly distributed about the central aiming mark;
- projecting the radial aiming light pattern onto the environment; and
- when a capture trigger is activated, capturing an image of the environment in the FOV.

* * * * *